United States Patent
Murray et al.

(10) Patent No.: US 9,846,784 B1
(45) Date of Patent: Dec. 19, 2017

(54) MULTI-LEVEL STORAGE SYSTEM AND METHOD

(71) Applicants: Daniel S. Murray, Minnetonka, MN (US); James A. Marek, Anamosa, IA (US)

(72) Inventors: Daniel S. Murray, Minnetonka, MN (US); James A. Marek, Anamosa, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 13/777,824

(22) Filed: Feb. 26, 2013

(51) Int. Cl.
| | |
|---|---|
| *G06F 21/00* | (2013.01) |
| *G06F 21/62* | (2013.01) |
| *G06F 21/60* | (2013.01) |
| *H04L 29/08* | (2006.01) |
| *H04L 29/06* | (2006.01) |
| *G06F 17/30* | (2006.01) |

(52) U.S. Cl.
CPC ........ *G06F 21/6218* (2013.01); *G06F 21/602* (2013.01); *H04L 67/1097* (2013.01); *G06F 17/30091* (2013.01); *H04L 63/105* (2013.01)

(58) Field of Classification Search
CPC ..... H04L 63/20; H04L 63/08; H04L 41/0893; H04L 67/1097; H04L 67/28; G06F 21/6218; G06F 21/602; G06F 21/60; G06F 2221/2107; G06F 17/30067; G06F 17/30194; G06F 17/30091; G06F 21/62; G06F 21/6245; G06F 2221/2113
See application file for complete search history.

(56) References Cited

U.S. PATENT DOCUMENTS

| | | | |
|---|---|---|---|
| 7,716,720 B1 | 5/2010 | Marek et al. | |
| 8,793,465 B1* | 7/2014 | Forgette | G06F 12/109 711/154 |
| 2003/0115447 A1* | 6/2003 | Pham et al. | 713/153 |
| 2005/0081048 A1* | 4/2005 | Komarla et al. | 713/193 |
| 2005/0125657 A1* | 6/2005 | Haight | 713/160 |
| 2006/0248083 A1* | 11/2006 | Sack et al. | 707/9 |
| 2007/0226517 A1* | 9/2007 | O'Brien et al. | 713/189 |
| 2008/0086613 A1* | 4/2008 | Mosek et al. | 711/163 |
| 2009/0106543 A1* | 4/2009 | Pekny | 713/2 |

(Continued)

*Primary Examiner* — Lisa Lewis
*Assistant Examiner* — Christopher C Harris
(74) *Attorney, Agent, or Firm* — Donna P. Suchy; Daniel M. Barbieri

(57) ABSTRACT

A data storage system is provided. The system includes an electronic storage architecture configured to be coupled to a computing system and a storage medium. The architecture mediates the storing and accessing of data at the storage medium in response to the commands to write or read data. The architecture includes a file interface configured to process at least one attribute associated with data. The architecture includes a crypto interface configured to encrypt and decrypt the data based on the at least one attribute. The at least one attribute specifies a classification level of the data. The crypto interface includes cryptographic functions. Each cryptographic function is associated with a different classification level. The architecture includes a storage interface configured to provide a mapping between partitions on the storage medium and the cryptographic functions. Each of the partitions is associated with a different classification level.

18 Claims, 9 Drawing Sheets

(56) References Cited

U.S. PATENT DOCUMENTS

| | | | |
|---|---|---|---|
| 2009/0172393 A1* | 7/2009 | Tanik et al. | 713/160 |
| 2009/0254972 A1* | 10/2009 | Huang et al. | 726/1 |
| 2010/0223576 A1* | 9/2010 | Serra et al. | 715/781 |
| 2011/0145593 A1* | 6/2011 | Auradkar et al. | 713/189 |
| 2012/0291133 A1* | 11/2012 | Nagpal et al. | 726/26 |
| 2013/0219176 A1* | 8/2013 | Akella et al. | 713/165 |
| 2013/0254539 A1* | 9/2013 | Auradkar et al. | 713/165 |

* cited by examiner

MULTI-LEVEL STORAGE SYSTEM AND METHOD

BACKGROUND OF THE INVENTION

The present disclosure relates generally to the field of secure storage and retrieval of sensitive data. More particularly, the present disclosure relates to providing a multi-level storage architecture with cryptographic security and file-based operations.

Advances in multi-level processing capability, as well as an increase in global connectivity for tactical and operational platforms, have driven platforms to support multiple levels of sensitive and classified data simultaneously while ensuring separation and confidentiality for each domain as required by data owners. These platforms simultaneously host and protect a wide range of data, for example, from unclassified maintenance and system health data to highly sensitive mission, tactical, and/or intelligence data. It would also be advantageous if these platforms allowed a broader range of services and file based operations to manage the data.

Processing of multiple security domains can be addressed through architectural solutions, such as redundant hardware operating at different classification levels. However, this leads to increased size, weight, and power (SWAP), which can be prohibitive in airborne platforms.

Therefore, there is a need for a partitioned large capacity storage architecture that processes multiple security domains. There is also a need for a multi-level design that supports a range of services that allow two-way transfer of data at a lower SWAP for multiple security domains on commonly used storage media hardware.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

One embodiment of the invention relates to a method of storing data. The method includes receiving, at a first interface, data to be stored and at least one attribute. The at least one attribute includes a write command. The method includes associating the data to be stored with the at least one attribute. The at least one attribute specifies a classification level of the data to be stored. The method includes transmitting the data to be stored and the at least one attribute to a second interface. The method includes encrypting, at a second interface, the data to be stored, based on the at least one attribute and transmitting the encrypted data to a third interface. The second interface differently encrypts data associated with different classification levels. The method includes bypassing the encrypting step for the at least one attribute and transmitting the at least one attribute to the third interface. The method includes associating, at the third interface, the encrypted data with the at least one attribute and determining a location on a storage medium for storing the encrypted data based on the at least one attribute. The method includes transmitting the encrypted data to the storage medium. The storage medium includes a plurality of locations. Each location is associated with a different classification level.

Another embodiment of the invention relates to a method of accessing stored data. The method includes receiving at least one attribute at a first interface. The at least one attribute includes a read command for data to be accessed. The method includes transmitting the at least one attribute to a storage medium. The method includes receiving encrypted data from the storage medium at a third interface, based on the at least one attribute. The storage medium includes a plurality of locations. Each location is associated with a different classification level of encrypted data. The method includes associating, at the third interface, the encrypted data with the at least one attribute and determining a classification level of the encrypted data. The method includes transmitting the encrypted data and the at least one attribute to a second interface. The method includes decrypting, at the second interface, the encrypted data based on the at least one attribute and transmitting the decrypted data to a first interface. The second interface differently decrypts data associated with different classification levels. The method includes bypassing the decrypting step for the at least one attribute and transmitting the at least one attribute to the first interface.

Another embodiment of the invention relates to a data storage system. The data storage system includes an electronic storage architecture configured to be coupled to a computing system and a storage medium. The electronic storage architecture mediates the storing and accessing of data at the storage medium in response to the commands to write or read data received from the computing system. The electronic storage architecture includes a file interface configured to process at least one attribute associated with data. The at least one attribute comprising at least one of a storage command attribute, a storage medium location attribute, a storage medium master boot record attribute, a configuration attribute, and a data classification attribute. The electronic storage architecture includes a crypto interface configured to encrypt and decrypt the data based on the at least one attribute. The at least one attribute specifies a classification level of the data. The crypto interface comprises a plurality of cryptographic functions. Each cryptographic function is associated with a different classification level. The crypto interface includes a bypass channel configured to transmit the at least attribute without encryption or decryption. The electronic storage architecture includes a storage interface configured to provide a mapping between a plurality of partitions on the storage medium and the plurality of cryptographic functions. Each of the plurality of partitions is associated with a different classification level.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
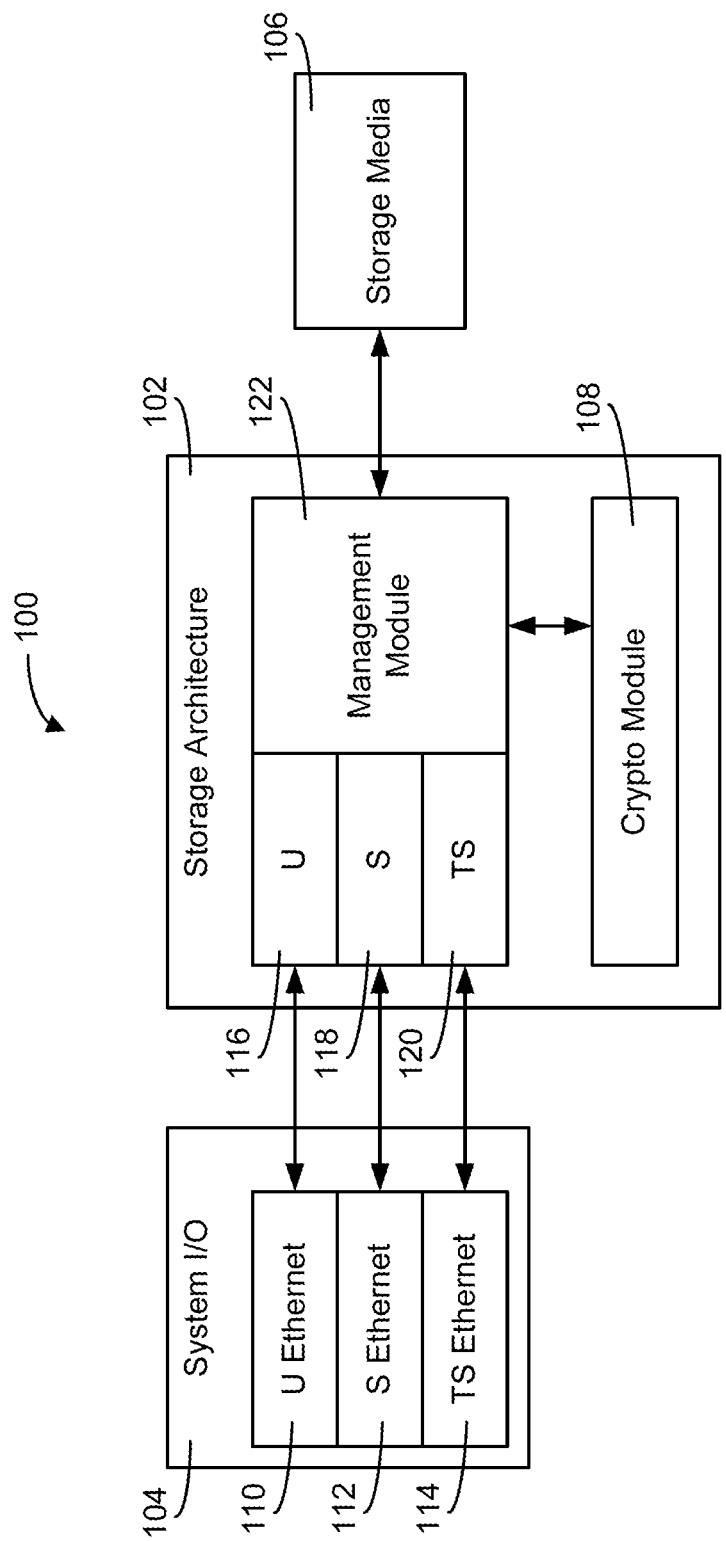
FIGS. 1-2 are block diagrams of a storage system, according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In one or more embodiment of the present disclose, systems and methods of protecting and storing digital content to shared storage media in a multi-level environment are provided. In one or more embodiments, the storage architecture described herein is advantageously configured to store multiple levels of classified data on shared media devices. The architecture described is not limited to any specific media or platform interface. This advantageously allows versatility through the development of tailored interfaces, depending on the needs, limitations, and/or requirements of a particular task. In one or more embodiments, a storage architecture is advantageously configured to present a file-based interface to the connected platform. This advantageously allows a broader range of services and file-based operations (e.g., create/move/delete files, create/move/delete folders, retrieve data using file name, etc.) for data management.

Figure 2:
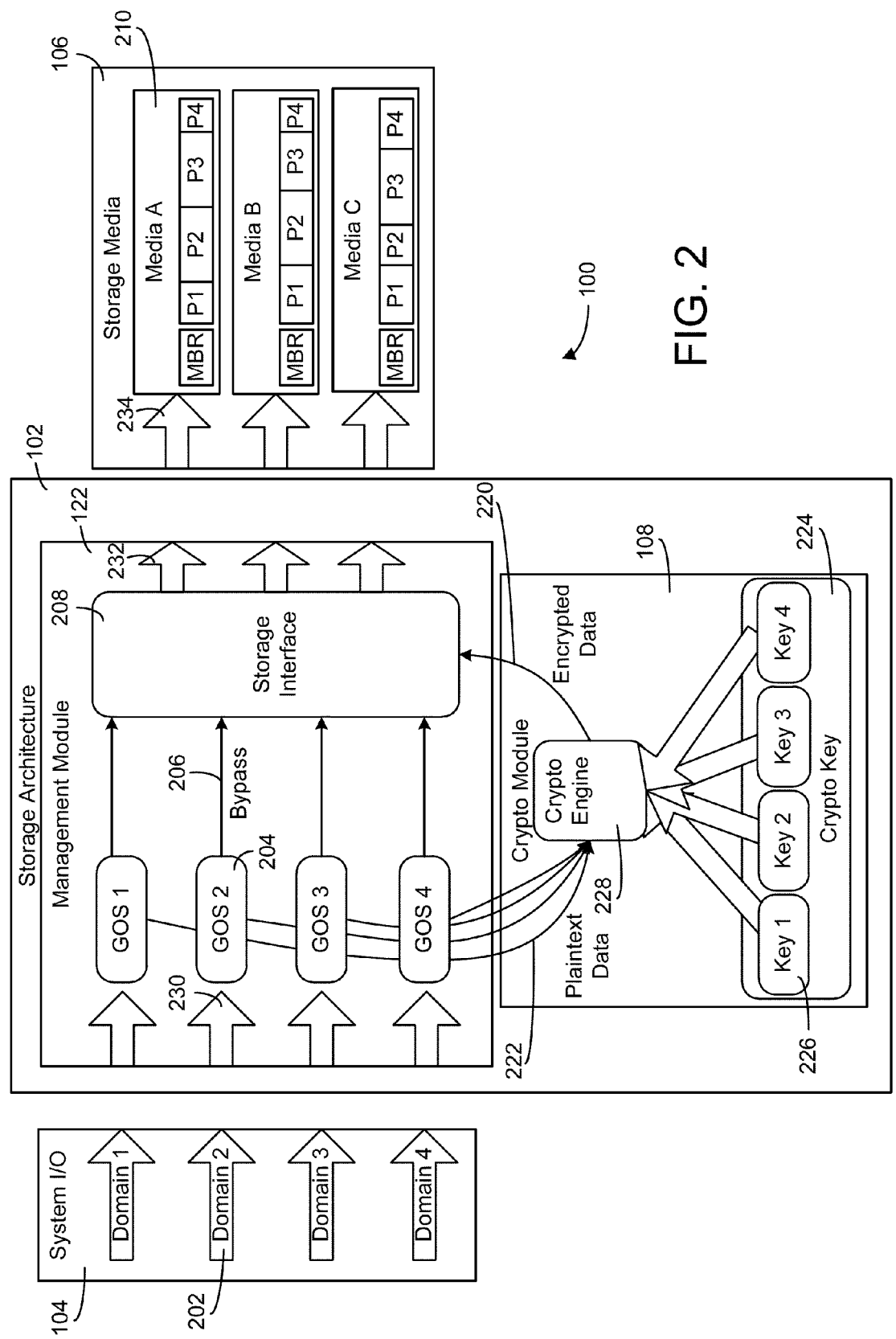

Referring to FIGS. 1 and 2, a block diagram of a storage system 100 is shown, according to an exemplary embodiment. FIG. 1 is a simplified view of storage system 100. FIG. 2 is a more detailed view of storage system 100. Storage system 100 generally includes three components: (1) one or more computing devices operable or otherwise accessible by a user and coupled to a storage architecture, at which the user inputs data to be stored and/or retrieves stored data; (2) a storage architecture that mediates the storage and/or retrieval of data, as explained in greater detail below; and (3) storage media on which the data is stored and/or from which data is retrieved. In other words, storage devices may be on one side, and a user interface may be on the other side. The storage devices may be considered a "black" side (all, or substantially all, unclassified, encrypted data); the user interface side may be consider the "red" or "rainbow" side (all, or substantially all, classified or unencrypted data, with one or more classification levels). The storage architecture may effectively be a multiplexor in the middle that is configured to understand which security domain/classification level goes to each partition on each media device. A single media device may have data associated with different classifications levels stored next to each other. The storage architecture advantageously acts as a multiplexor and encrypts the data associated with the different classification levels so the data can be stored next to each other. When data is being retrieved, the storage architecture may advantageously act as a multiplexor and decrypt the data associated with different classifications. The storage architecture may include a processor configured to map the classification levels with the partitions on the storage media and route the data to the correct partition (the partition associated with the classification level of the data). The storage architecture may also be configured to ensure that a user on the user interface side will only be able to access a particular security level (e.g., a user accessing the "secret" security level will see only the "secret" partition and be able to store data only to the "secret" security level partition on the storage media).

In FIG. 1, the one or more computing systems from which data to be stored originates and at which stored data is retrieved are only partially depicted; they are represented by system I/O 104. These one or more computing systems are any client device, server device, and/or any combination thereof. These computing systems may be referred to in the discussion herein as "connected" or "coupled" system. Connected and coupled refers to any method of wired or wireless communication between the computing systems, storage architecture, and/or storage media. FIGS. 1 and 2 also include storage architecture 102 and storage media 106. FIG. 2 includes arrows showing a direction of data flow through storage system 100. The direction of data flow may correspond to data to be stored in storage media that originates at a connected system represented by system I/O 104. In various embodiments, data may flow from the connected system to storage media 106 (data storage, with arrows in the direction shown in FIG. 2) and from the storage media 106 to connected system (data retrieval, with arrows in the opposite direction shown in FIG. 2).

System I/O 104 includes I/O interfaces 110, 112, and 114 (FIG. 1), and interface 202 (FIG. 2). In various embodiments, one or more interfaces may be provided. For example, FIG. 1 shows three interfaces 110, 112, and 114; FIG. 2 shows four interfaces 202. Storage electronics 102 also includes I/O interfaces 116, 118, and 120 (FIG. 1), and interface 204 (FIG. 2), which correspond to interfaces 110, 112, 114, and 202, respectively. These interfaces may enable communication between the connected system (represented by system I/O 104) and the storage electronics 102. Storage electronics 102 communicates to storage media 106 via interfaces 232 of storage electronics 102 and interfaces 234 of storage media 106. All of the interfaces shown and/or described herein may be any wired or wireless networking and/or communication protocol, including any hardware and/or software, that facilitates data transfer between one or more computing systems. FIG. 1, for example, shows that system interfaces 110, 112, and 114, and storage interfaces 116, 118, and 120, use Ethernet.

According to an exemplary embodiment, each interface may correspond to a particular domain. In FIG. 2, for example, four domains are shown, each associated with a different interface 202. According to an another exemplary embodiment, each domain corresponds to a different data classification level. Data classification levels may be based on any taxonomic method (i.e., a method of categorizing information). The taxonomy used in FIG. 1 includes various security classification levels, which, for example, may be used in a military/defense environment. For example, "U" indicates unclassified data, "S" indicates secret data, and "TS" indicates top secret data. Various embodiments may include more, fewer, and/or different classification levels. Advantageously, a unique data flow path may be provided for each domain. That is, only data with the same classification may utilize particular interfaces. For example, top secret data originating at the connected system may be transmitted to the storage electronics via interface 202 (FIG. 2) and received at storage electronics 102 via interface 230. As described in more detail below, each media 210 of storage device 106 may similarly correspond to a particular domain. The interfaces between storage electronics 102 (interface 232) and storage media 106 (interface 234) may also uniquely correspond to a particular domain. Thus, data being stored and/or retrieved may follow the same, unique path between the connected system (system I/O 104), storage electronics 102, and storage device 106 as similarly classified data (and follow a different path as differently classified data). As described in greater detail below, each domain may also correspond to a particular cryptographic process/function.

Storage system 100 includes storage architecture 102. Storage electronics 100 are described in greater detail in the discussion of FIG. 3. Storage architecture 102 includes storage management module 122. In some embodiments, storage I/O interfaces 116, 118, 120 are considered as separate from storage management module 122 (as shown in, e.g., FIG. 1); in other embodiments, interfaces 116, 118, 120 are considered part of storage management module 122 (as shown in, e.g., FIG. 2). In various embodiments, crypto interface 108 is considered as part of or separate from storage management module 122.

Management module 122 includes storage I/O interface 230, file interface or guest operating system 204, crypto interface 108, storage interface 208, and media interface 232. Interface 230 is represented by an arrow in FIG. 2, showing, for example, the direction of data flow when a request to store data is being processed. System I/O data may be received from the system interface 104 at storage I/O interface 230. According to an exemplary embodiment, system I/O data is processed by a separation kernel operating system (SKOS) at the storage I/O interface 230. The system I/O data may then be transmitted to a guest operating system (GOS) or file interface 204. In the embodiment of FIG. 2, a separate storage I/O interface 230 and file interface 204 is shown for each classification level. That is, data received at a particular storage I/O interface 230 may be transmitted to the corresponding file interface 204 for the particular classification level. Storage architecture 102 may include multiple interfaces 230 and file interfaces 204, one for each classification level. In other embodiments, a multi-level security (MLS) interface may be provided. The MLS interface be configured to process multiple classifications of information "labeled" with corresponding classification level. In various embodiments, storage architecture 102 may include only multiple single-level interfaces, only MLS interface(s), or both single-level and MLS interface(s).

According to an exemplary embodiment, system-facing services running in the GOS 204's application layer may process requests to read or store media contents. The GOS's file access layer provides disk management and file-based operations, such as responding to read/write operations from application layer services. Crypto interface or module 108 receives commands and user data, filtering command and address information through a bypass channel 206 and encrypting user data before sending on for storage or decrypting data traveling from the media back to the system. The storage interface 208 receives re-assembled commands and encrypted user data, identifies which storage media 210 and partition to send the data to, and transmits the identified data to media interface 232. User data flowing from storage media 106 back to the system 104 may sent to the appropriate crypto interface 108 (to, e.g., decrypt the user data) based on configuration data (e.g., data mapping location on a storage media, classification level, and/or cryptographic function). Media interface 232 provides bus-level communication with the physical storage media, including, e.g., executing commands and returning status information.

Crypto interface or module 108 includes hardware and/or software for encrypting and/or decrypting data. According to an exemplary embodiment, crypto module 108 is coupled with storage electronics 102. This may advantageously allow data separation as well as data at rest protection on storage media 106 to be achieved through cryptography. This may also advantageously enable a large range of system and storage interface options and services to be provided to the connected computing device (via, e.g., system I/O 104).

Storage system 100 includes storage device 106. Storage device 106 may be one or more tangible computer- or machine-readable storage media. According to an exemplary embodiment, storage device 106 may store encrypted, unclassified, and/or "black" data. Storage device 106 may be local to or remote from storage electronics 102. The one or more storage media of storage device 106 may local to each other or remote from one another. Thus, storage device 106 may include any hardware and/or software for networking/communicating with, e.g., storage electronics 102. In FIG. 2, storage device 106 is shown to include media A-C (210). Media 210 and other media include a master boot record (MBR) and one or more partitions of varying sizes (e.g., partitions P1-P4). Storage device 106 also includes a media interface 234. According to an exemplary embodiment, each storage media 210 stores data associated with multiple data classifications. For example, partitions P1-P4 of media 210 may each store data associated with a different classification. For example, partition P2 may store unclassified data, partition P3 may store secret data, and partition P4 may store top secret data. Storage architecture 102 may be advantageously utilized with one drive 210 or many drives. Applications (via a connected system) in network space that communicate with storage architecture 102 may be unaware that data is stored on one or more drives.

Advantageously, each classification level is assigned a unique channel for data flow between the connected computing device and the storage media. According to an exemplary embodiment, crypto module 108 is configured with cryptographic keys 226 for each security domain 202, which correspond with the levels of each system I/O interface 104. Data passed from the system to a storage device may be encrypted prior to storage using the appropriate cryptographic key. This may ensure that data from all security domains can be treated as unclassified (because it has been encrypted) and stored in a partitioned manner on shared media. Data requested from the storage media by the system may be unencrypted using a cryptographic key before it can be sent to the appropriate security domain. In the event of a misconfiguration or system error, confidentiality is advantageously ensured, as data sent to the wrong domain cannot be decrypted without the correct cryptographic key.

Figure 3:
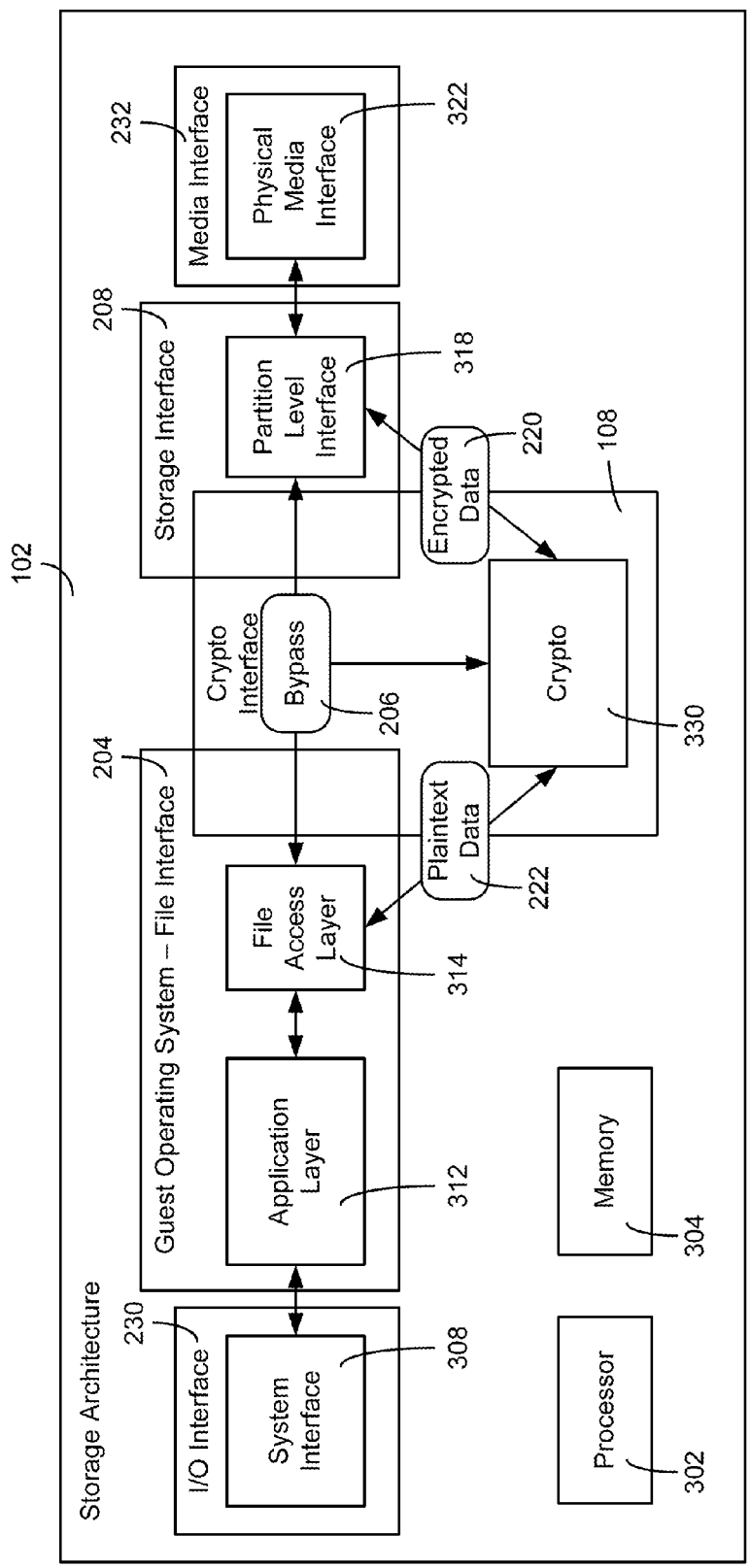
FIG. 3 is a block diagram of a single level of a storage architecture of FIGS. 1-2, according to an exemplary embodiment.

Referring to FIG. 3, a block diagram of a single-level view of a storage architecture 102 is shown, according to an exemplary embodiment. "Single-level" refers to the data flow channel for a particular classification level. According to an exemplary embodiment, the storage architecture 102 has multiple levels, each level including hardware and software protocols as described below. According to an exemplary embodiment, only one of certain components of architecture 102 may be included in the multi-level architecture. For example, various domain/classifications may utilize one storage interface 208. Data and commands received from connected systems flow through the architecture 102 as described below.

Storage architecture 102 may include processor 302. Processor 302 may execute machine-readable instructions for implementing the processes described herein. Processor 302 may be implemented as a general purpose processor, an application specific integrated circuit (ASIC), one or more field programmable gate arrays (FPGAs), a group of processing components, or other suitable electronic processing components. Processor 302 may be configured to run a separation kernel or similar utility to provide periods processing of multiple classification levels of information. Crypto module 108 may be compatible with processor 302. Processor 302 may support an interface that allows communication to it at different classification levels at different times (e.g., ability to simultaneously process to "top secret" data, "secret" data, or unclassified data). In some embodiments, processor 302 may include multiple single-level interfaces that are simultaneously being communicated on.

Storage architecture 102 may include memory 304. Memory 304 may store machine-readable instructions comprising the processes described and/or other processes required to implement the process described herein. Memory 304 is one or more devices (e.g., RAM, ROM, Flash memory, hard disk storage, etc.) for storing data and/or computer code for completing and/or facilitating the various processes and modules described in the present disclosure. Memory 304 may be or include volatile memory or non-volatile memory. Memory 304 may include database components, object code components, script components, or any other type of information structure for supporting the various activities and information structures described in the present disclosure. According to an exemplary embodiment, memory 304 is communicably connected to processor 302 via a processing circuit and includes computer code for executing (e.g., by processing circuit and/or processor 302) one or more processes described herein. In some embodiments, processor 302 and processor 304 may be similar to the system described in U.S. Pat. No. 7,716,720, which is assigned to the assignee of the present application and incorporated by reference herein in its entirety.

Media interface 232 handles the physical interface to the storage device 106 and/or media 210 using one or more bus interfaces such as SATA, USB, IEEE 1394, SCSI, Fiber Channel, etc. Interface 232 processes requests from storage interface 208 to read or write data to storage media sector addresses, interacts with the storage media, and returns the results to the storage interface 208. According to an exemplary embodiment, user data (data stored or retrieved) passing through the media interface 232 is assumed encrypted. Master Boot Record (MBR) contents may not be encrypted without affecting basic functionality. According to an exemplary embodiment, storage electronics 102 includes one shared media interface 232, which can manage access to single or multiple installed storage devices 106, depending on configuration.

Figure 5:
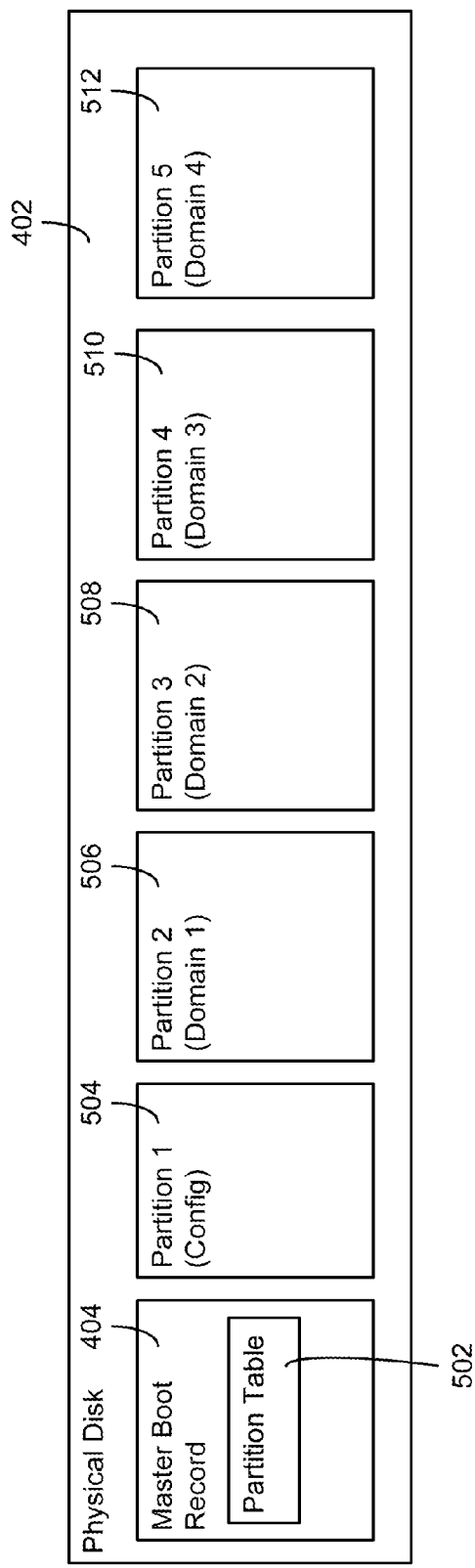
FIG. 5 is an illustration of the partitions of a storage medium, according to an exemplary embodiment.

Storage electronics 102 includes storage interface 208. Storage interface 208 processes a partition table contained in the Master Boot Record 404 (FIG. 5) of media 210. One embodiment of a disk partition allocation is shown in FIG. 5. Partition table 502 may provide a mapping between partitions 504-512 on physical disk 402 (media 210 of FIG. 2) and the crypto interface 108 for each domain. According to an exemplary embodiment, each security domain is prevented from reading from or writing to sector addresses outside of their partition allocation. As shown in FIG. 5, data for each classification level or domain (domains 1-4) is stored in different partitions. Storage interface 208 may pass a portion of the MBR to the file interface 204 in order to communicate each partition's address range to the operating system. According to an exemplary embodiment, each media device 210 may include no more than one partition for each security domain. User data passing through the storage interface 208 may be encrypted. Any data sent to the wrong crypto interface 108 due to a software or configuration error would be decrypted using an incorrect key; thus, advantageously, the contents would not be exposed. According to an exemplary embodiment, one storage interface 208 is included. Storage interface 208 may have one connection to the media interface 232 and individual connections to the crypto interface 108 for each security domain. According to an exemplary embodiment, the method for mapping of drive partitions to security domains will reserve the first partition 504 on each storage media 210 for configuration data. Partition 504 may include the configuration data required to associate each partition on storage device 102 with a security domain in use on the connected system. Configuration data may take any number of forms that represent a mapping table between the different security domains that are going to be hosted on the system and the partitions that are on that physical disk or media 210. The configuration data may be utilized by processor 302 to perform the multiplexing functions required to rout the data to the appropriate location on the physical disk or media 210.

Storage architecture 102 includes crypto interface 108. Crypto interface 108 performs encryption and decryption services for data sent between the storage interface 208 and file interface 204. Key loading may be performed through a side channel, such as a crypto ignition key (CIK) 224 connected directly to the cryptographic processing device or engine 228. According to an exemplary embodiment, cryptographic processing operates on a sector level using the AES XTS algorithm, where the physical sector ID is used as part of the key material. In other embodiments, other general purpose algorithms and/or algorithms for data at rest applications may be used. Suite A algorithms, Suite B algorithms, or customer-specific algorithms may be used. According to an exemplary embodiment, multi-level crypto hardware and software (one chip for multiple security domains) is implemented in crypto interface 108. In memory mapping may be implemented on processor 228. A key manager function may be used, with multiple cryptographic keys. When storage architecture 102 switches from accessing one partition of media 210 to another, processor 302 completes a partition swap (flipping from one partition to another). Crypto engine 228 may also complete a partition swap at the same time. A mechanism may be implemented between processor 302 and engine 228 to indicate the switch in partitions. In some embodiments, the mechanism may be that, when a packet is received from a different address, a partition swap is required. In other embodiments, two functions, one for each of processor 302 and engine 228, may be utilized. The key manager, from a networking perspective, may reside in a control plane (as opposed to a data plane). Thus, the specific key loading interface on the crypto may be separate from the data path.

In some embodiments, a separation kernel and/or periods processing may be utilized. Memory mapping between partitions of the media 210 and processing device 228 may also be implemented. An enforcement mechanism, e.g., a memory management unit (MMU), may allow access to only certain addresses of media 210. The physical hardware (e.g., PCI bus, etc.) coming off the processor may be routed to different partitions of media 210. The partitions may be memory mapped so that other physical channels are not visible on the communication path for each partition. The partitions may only access their corresponding process channel through the memory mapping mechanism. Hardware and/or software for a trusted multiplexor function may be implemented. In some embodiments, the trusted multiplexor function may be referred to as a packet manager for managing packets of data to approximately the level of real routing functionality. In other embodiments, a separate physical crypto chip may be utilized for every security domain level that is required to be stored on media 210. In such embodiment, the separate crypto chips may each be physically routed to processor 228.

In some embodiments, crypto engine 228 itself may be periods processed. A single level crypto engine may be cleansed between uses. The crypto engine 228 may be used to write to particular addresses and then used as a crypto engine. The crypto engine 228 may then flip functions to write to a different address, and then function as a crypto engine.

Operations of storage architecture 102 may require the use of a bypass channel 206 for command instructions and other non-data attributes. Any data passing through bypass channel may be described herein as an "attribute" (as opposed to, e.g., user data, data for storage, or data being retrieved). Bypass channel 206 may be provided by the selected crypto device or through a trusted software function. Bypass channel 206 may transmit unencrypted items such as low disk commands, which may, e.g., allow storage media 210 (the "black" side) to route data to the correct disk and/or correct partition. The low level disk commands may include instructions to, e.g., write it to the disk or read from the disk. Bypass 206 may effectively sit alongside the crypto 108. For example, whenever a file is being stored to the disk, all of the data that is going to be stored may be encrypted so that it is protected. A store command that indicates "store data on a particular sector of the disk" may be transmitted with the data. According to an exemplary embodiment, the store command is not encrypted. Other types of attributes may also go through the bypass 206. For example, attributes required to allow a crypto interface 108 to utilize a correct key for encryption and decryption may be passed through bypass 206. This attribute may be advantageously utilized when storage system 100 has multiple security domains. Other attributes may be part of a routing or addressing scheme for discriminating between the different security domains (and associated cryptographic keys). During storage, the address may be utilized so that location of data on media 210 may be identified when the data is later being retrieved. During retrieval, the attribute may, e.g., enable crypto module 108 to determine which domain the information should be decrypted to. If storage architecture 102 utilizes an incorrect key for decryption during data retrieval, the output will be garbled or otherwise unable to be understood, thus avoiding an unintended access to the data.

In some embodiments, storage architecture 102 may include binding and validating of the one or more attributes to the data to be stored. Binding may refer any process(es) to associate the one or more attributes with the data to be stored. Validating may refer to any process(es) to verify the association between the attribute and the data to be stored (e.g., certificate authority, local trust model, etc.). For example, a signed message may include binding of the message and at least one attribute; the signed message may be validated using, e.g., public key cryptography.

In some embodiments, a critical boot sector of the storage media 210 may be unencrypted so that processor 302 may determine what partitions are on the disk and then associate the partitions with the security domains. In other embodiments, the critical boot sector may be encrypted, and storage architecture 102 may include an encryption/decryption approach that allows multiple security domains to decrypt the critical boot sector with the security key associated with the domain. In various embodiments, each security domain may have sufficient access to determine the structure of the associated partition but not raw access to the critical boot sector. Bypass 206 may ensure that only valid commands are transmitted by file interface 204 and may perform range checking of sector addresses and other attributes based on accepted interface standards. Bypass 206 may effectively be a filter that allows only certain attributes to pass through storage architecture 102 unencrypted. Store commands, read commands, and other low level disk commands may be allowed to pass through unencrypted to the storage media so that the commands may be correctly interpreted. Bypass 206 may advantageously ensure that user data (classified data) that does require encryption does not pass through bypass 206.

According to an exemplary embodiment, storage electronics 108 includes a unique crypto interface for each security domain operating within the system. For example, as shown in FIG. 2, crypto key 224 includes four individual keys 226 for each of four security domains in the system (four domains 202, four file interface or guest operating systems 204, four partitions on media 210, etc.). More, fewer, and/or different security domains may be included in various embodiments. Unclassified security domains may, for example, opt to utilize a software-based FIPS algorithm (or other algorithms) rather than installing additional cryptographic hardware, or may bypass encryption entirely. Both commands and data may be sent from the file interface 204 to the crypto interface 108. This advantageously allows the system to govern data sent unencrypted between the file interface 204 and storage interface 208. Crypto interface 108 may ensure that all data contents pass through the crypto function 330. Crypto function 330 (FIG. 3) may be a more general representation of crypto engine 228 and crypto ignition key 224 (FIG. 2). For added security, some embodiments of crypto interface 108 can provide stateful filtering to ensure that any data passing from the storage interface is in response to an associated file interface request (e.g., store file X, retrieve file Y, etc.). Due to the modularity of the storage architecture, a range of technology options may be advantageously utilized to meet a given installation's specific needs for performance, cost, or SWAP. This may include a MILS cryptographic solution, single-level cryptographic solution, or a bypass for select domains that may not require data at rest protection.

Storage architecture 102 includes a file interface 204. File interface 204 may handle file and folder requests from the guest operating system and its applications. The file interface functional block 204 includes both file access layer 314 and application layer 312. File access layer 314 provides file handling and partition-level capabilities to services running in the guest operating system including, e.g., file creation, deletion, modification; folder creation, deletion, modification; disk space management; FAT management and sector allocations, etc. Advantageously, storage architecture 102 includes a level of management of the storage media, including the ability to complete file transactions with the encrypted data. For example, a standard file system like interface may be provided for storing data and then retrieving the data using, e.g., the file name. Storage architecture 102 may provide effectively what looks like a raw disk interface to the user, so that the user does not have to know that there is a multilevel storage system behind the interface. Storage architecture 102 may be configured to work with one or more file systems on one or more partitions of media 210 (e.g., Linux, Microsoft Windows, etc.) Application layer 312 provides services to the system via connected I/O (system I/O 104 of FIG. 1). Application layer 312 functionality may change depending on the environment, including a range of functions, such as network services over Ethernet or a PCIe interface for high speed data transfer without intermediate services.

Storage architecture 102 includes file system I/O interface 230. System I/O interface 230 handles the physical interface to the connected system using standard interfaces such as Ethernet or PCI Express (PCIe). I/O interface 230 processes requests from the connected system to read or write file data, and passes those requests to services running in application layer 312. According to an exemplary embodiment, storage system 100 includes one system I/O interface 230 for each connected security domain used in the system (e.g., domains 202 of FIG. 1). User data passing through system I/O interface 230 may not be encrypted and may be handled according to requirements of the corresponding security domain.

Figure 4:
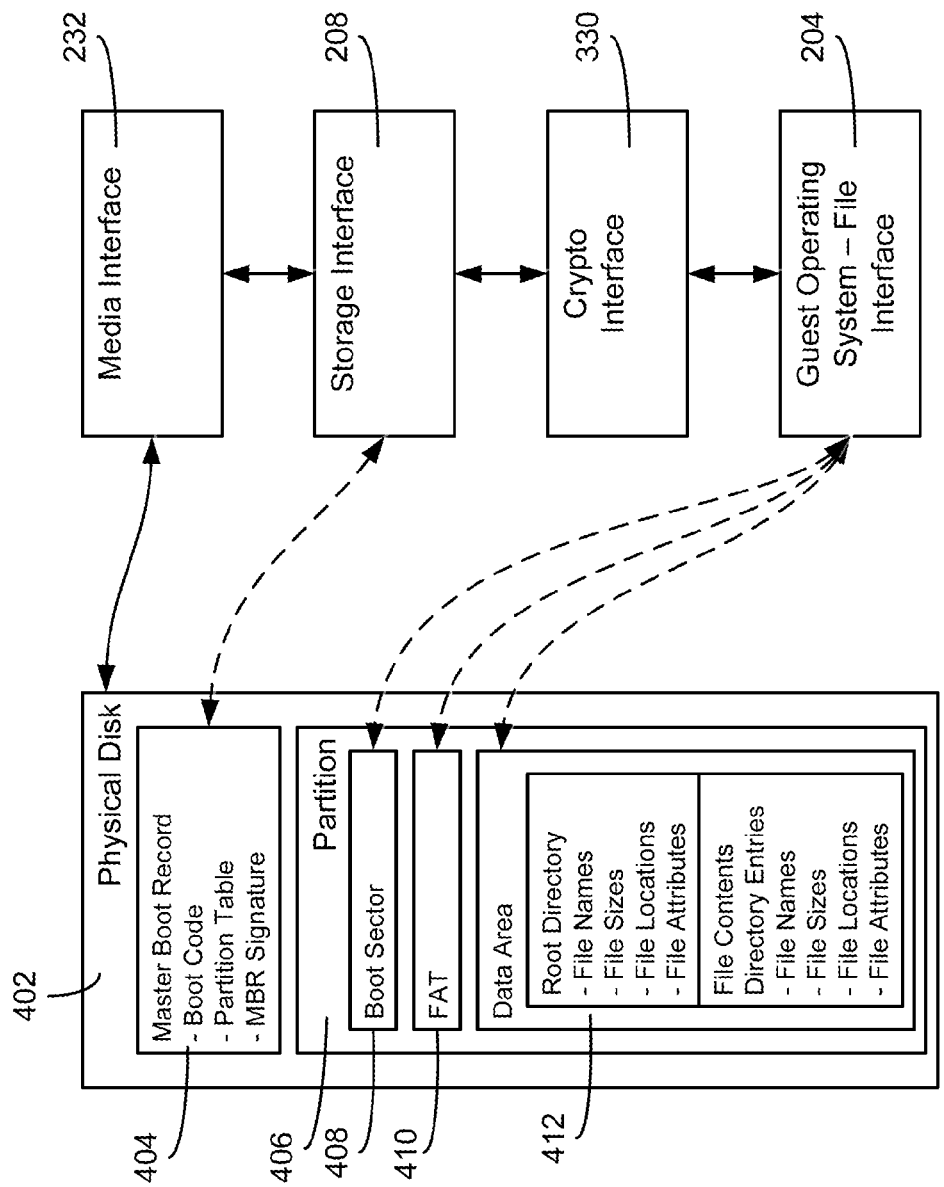
FIG. 4 is an illustration of logical mappings between layers of the file system of a storage medium to interface layers of a storage architecture of FIGS. 1-3, according to an exemplary embodiment.

Referring to FIG. 4, an illustration of logical mappings between layers of the file system of a storage medium (e.g., media 210 of FIG. 2) to layers of storage architecture 102 is shown, according to an exemplary embodiment. The logical mappings may be shown in dotted lines. Storage interface 208 may be mapped to master boot record 404. Storage interface 208 may process the partition table contained in master boot record 404, and communicate one or more non-data attributes to file interface 204 to specify the partition at which data is stored or from which data is to be retrieved. File interface 204 may be mapped to a partition 406 of the physical disk 402. Partition 406 may represent each of the partitions 506-512 of FIG. 5. Partition 406 may include boot sector 408, file allocation table (FAT) or other data system 410 attributes, and data area 412. A connected system may utilize file interface 204 to conduct one or more file-based operations (e.g., file creation, deletion, modification; folder creation, deletion, modification; disk space management; FAT management and sector allocations, etc.). Data flow between interface layers of storage architecture 102 may be enforced as shown solid lines and discussed with respect to FIG. 3. Physical disk 402 may interface with storage architecture 102 via hardware and/or software associated one or more bus interfaces of media interface 232. Data to be stored or retrieved, as well as the non-data attributes associated with requests to store or retrieve data, may be processed by media interface 232.

Figure 6:
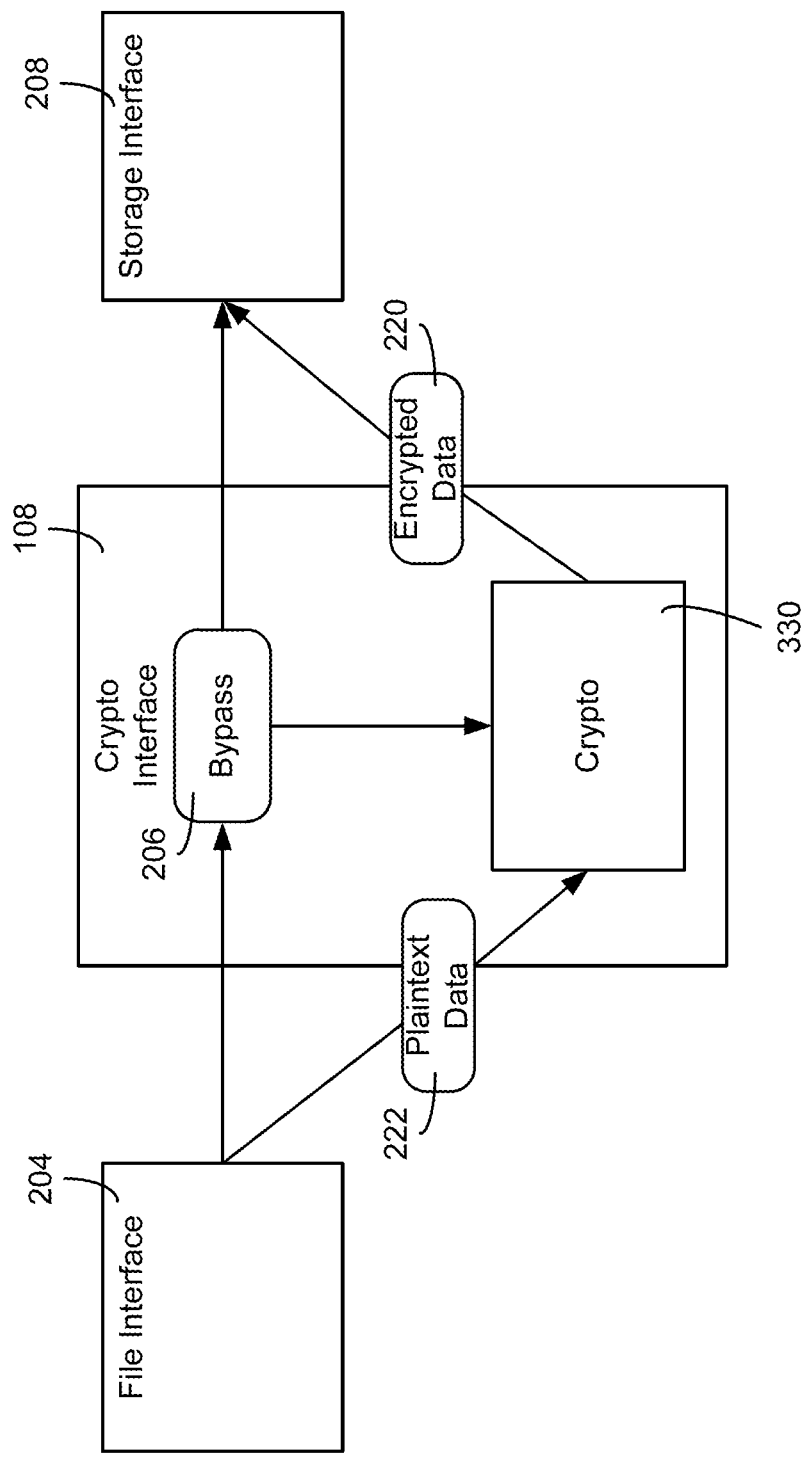
FIG. 6 is a block diagram of data flow from a connected system to storage media, according to an exemplary embodiment.

Referring to FIG. 6, a block diagram of data flow from a connected system to media is shown, according to an exemplary embodiment. The data flow originating at the system is the source of classified plaintext data. This data may be allowed to pass to the storage interface 208 via the crypto processing function 330, so that all data stored on the media can be treated as unclassified. The file interface 204 may transmit command messages to the storage interface 208, including well-defined fields such as operator codes, sector addresses, and/or a number of consecutive sectors to process. These command messages or attributes may be passed from file interface 204 to storage interface 208 via bypass channel 206. The file interface function 204 may require thorough analysis to ensure that only the appropriate command data is transferred via the unencrypted control channel 206 to the storage interface 208. In addition, the crypto bypass function 206 may be configured to filter commands and associated attributes to ensure that only valid commands and sector addresses within the allocated range are allowed to pass unencrypted through the crypto interface 108. This is advantageously enabled by the design of storage architecture 102 in that all user data, including file and directory names and attributes, may be managed at the file interface 204. In this configuration, user information is passed through the cryptographic function 330, limiting the control path 206 to command and sector information.

Figure 7:
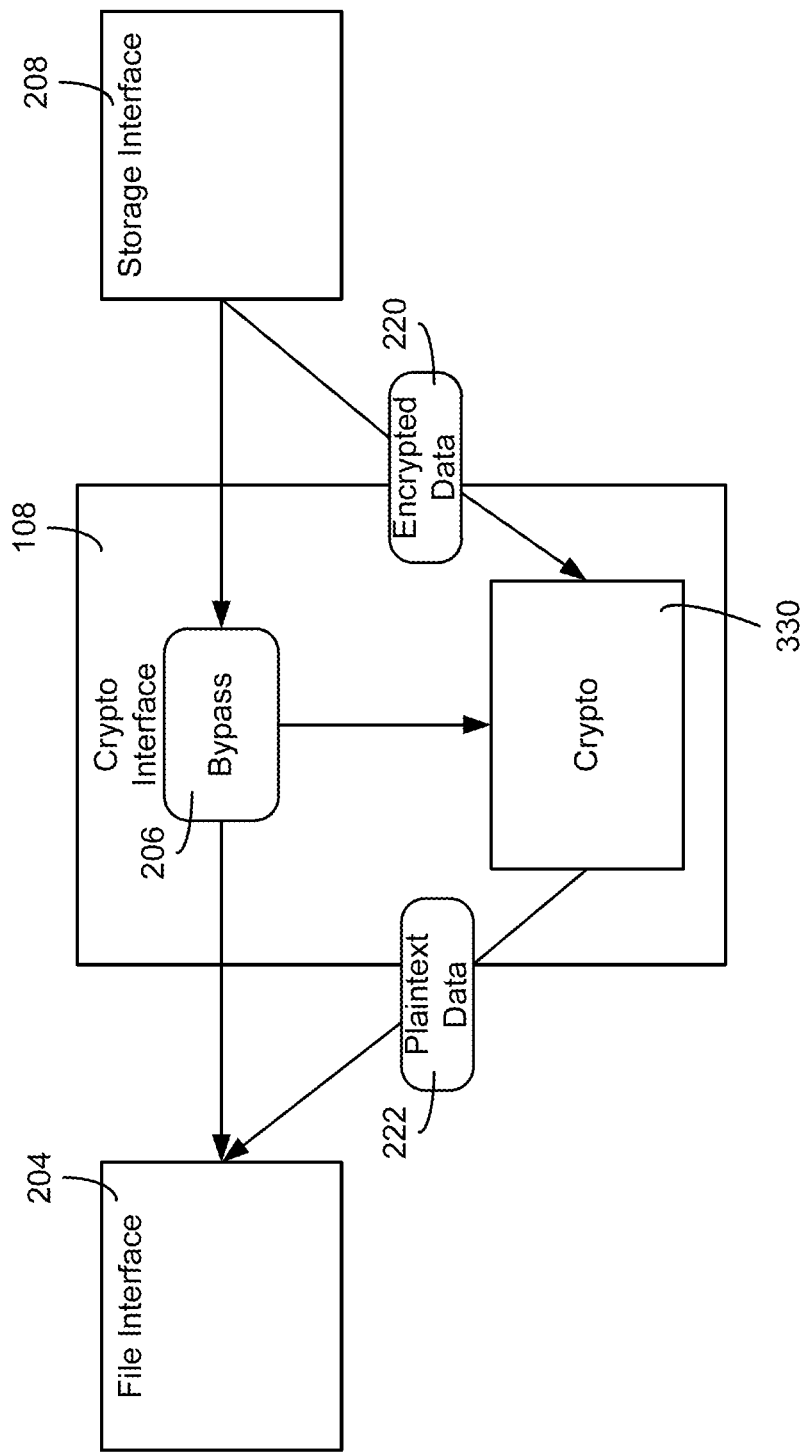
FIG. 7 is a block diagram of data flow from storage media to a connected system, according to an exemplary embodiment.

Referring to FIG. 7, a block diagram of data flow from media to a connected system is shown, according to an exemplary embodiment. The data flow which originates at the media interface 232 may contain unclassified or black data. User data in this portion of the system may be encrypted, including both data pre-loaded on the media and data generated during use of the system. Other information available to the media interface 232 is non-sensitive system data, including values such as sector addresses and operation status codes that give no indication as to the sensitive contents stored on the media. User data may be decrypted by the crypto function 330 between storage interface 208 and file interface 204. System data such as sector addresses and operation status codes (non-data attributes) may be transmitted to the file interface 204 from storage interface 208 via bypass 206. Various filtering processes, as described in the discussion of FIG. 6, may be provided to ensure only valid commands and attributes pass through bypass 206 without decryption.

Once user data is processed by the crypto interface 330, it may restored to its original classification level and may be handled as such by the receiving file interface 204 and the connected system. In the event that the storage interface 208 passes the incorrect data to the crypto interface 108 for a given partition, the crypto interface 108 will not have the correct key and will not be able to decrypt the data. Thus, no compromise will occur. For this reason, the storage interface 208 is advantageously not required to be a high assurance function.

Figure 8:
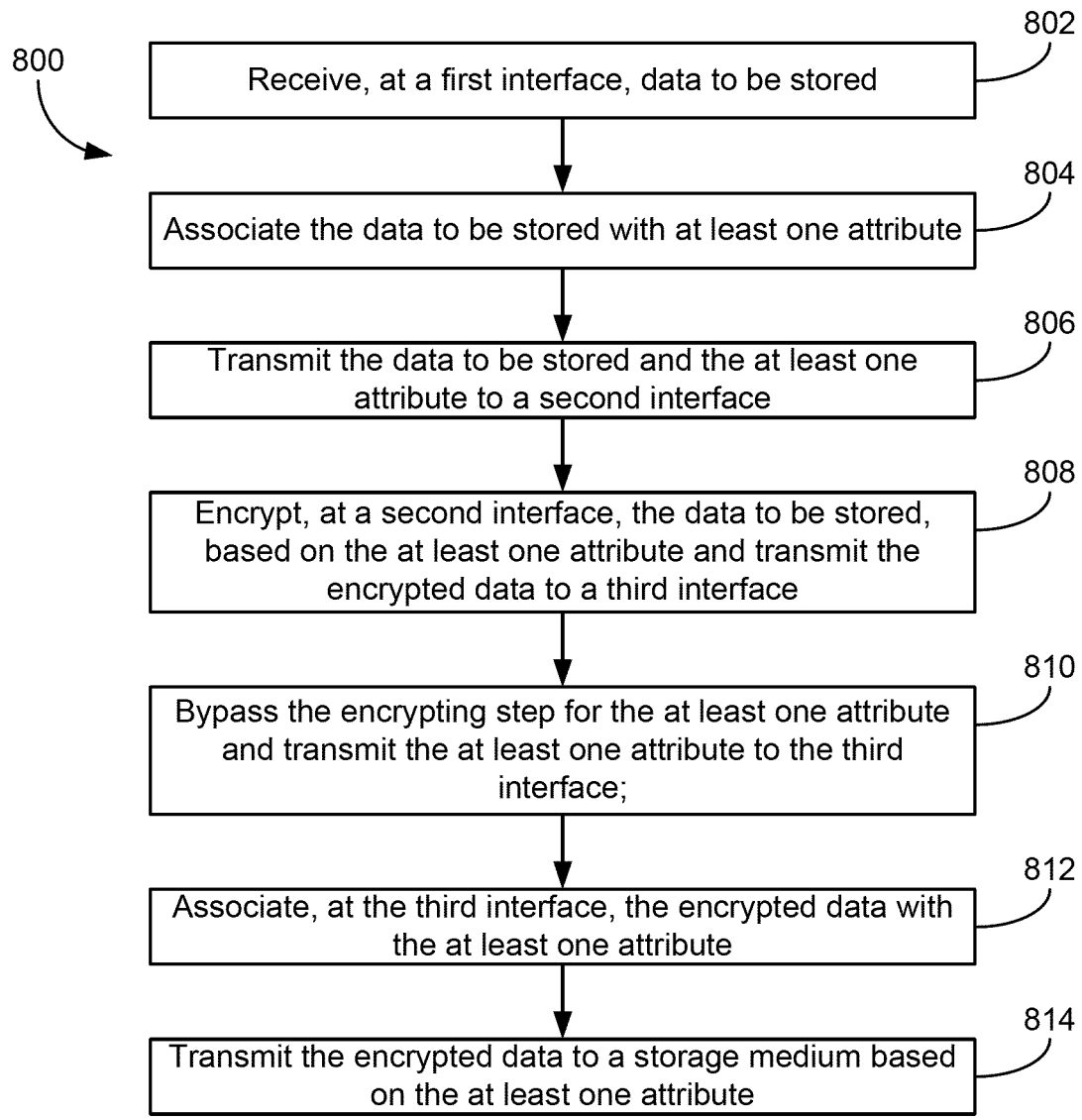
FIG. 8 is a flow diagram of a process for storing data, according to an exemplary embodiment.

Referring to FIG. 8, a flow diagram of a process 800 for storing data is shown, according to an exemplary embodiment. Process 800 may be implemented by storage system 100 and storage architecture 102 (FIGS. 1, 2, 3). Process 800 includes receiving, at a first interface, data to be stored (802). First interface may refer to the file interface 204 of storage architecture 102 (FIGS. 2, 3). At least one attribute may also be received at file interface 204. The at least one attribute may include a write command. The data to be stored may be received from a connected system (e.g., system I/O 104). The at least one attribute may also be received from connected system or may be generated by storage architecture 102 in response to a command received from the connected system. "Connected" may refer to wired or wireless communication and/or coupling between a computing device used to access data and the storage architecture 102. In other embodiments, the at least one attribute may comprise a variety of attributes, including a storage command attribute, a storage medium location attribute, a storage medium master boot record attribute, a configuration attribute, and a data classification attribute. The storage command attribute may include disk commands (read, write, etc.) The storage medium location attribute may indicate an address and/or sector range of media 210, at which the data is to be stored. A configuration attribute may include a mapping (or some portion thereof) between the physical disk and classification level. A data classification attribute may describe a domain, classification, and/or security level associated with the data.

In some embodiments, the data to be stored and/or at least one attribute may be received at a zeroth interface prior to being received at the first interface. The zeroth interface may refer to I/O interface 230 (FIGS. 2, 3). The I/O interface 230 of storage architecture 230 may be configured to communicate with a computing system coupled to at least one of the zeroth, first, second, and third interfaces. The computing system may be coupled in that the data originating from the computing system may be stored in, e.g., media 210, after the processes at the I/O interface 230, file interface 204, crypto interface 108, and/or storage interface 208. The data to be stored may be transmitted from the zeroth interface to the first interface.

Process 800 includes associating the data to be stored with the at least one attribute (804). The attribute, for example, may specify a classification level of the data to be stored. The attribute may be generated based on which I/O interface 230 (FIGS. 2, 3) the data is received at, in the exemplary embodiment where each I/O interface is associated with a different classification level. The attribute may be associated with data based on the particular interface 230 the write command and data to be written came from. In other embodiments, the attribute specifying the classification level may be generated based on other information regarding the data itself, the computing system from which the data originates, etc. In some embodiments, the first interface or file interface 204 may receive data associated with a plurality of different classification levels. In other embodiments, a unique file interface 204 for each data classification level may be provided.

Process 800 includes transmitting the data to be stored and the at least one attribute to a second interface (806). The second interface may refer to the crypto interface 108 (FIGS. 2, 3). The data to be stored may be encrypted at the crypto interface 108 (808). The encrypting may be based on the at least one attribute. Encrypting the data may include determining the classification level of the data based on the at least one attribute. For example, the at least one attribute may include a classification level for the data. Encrypting the data may include associating the classification level with one of a plurality of cryptographic process or functions. Each cryptographic process may be associated with a different classification level. For example, a crypto key 226 associated with the classification level may be used by crypto engine 228 in encrypting the data. In other embodiments, a different cryptographic processes may be used. The data to be stored may be encrypted using the selected cryptographic process. According to an exemplary embodiment, second interface or crypto interface 108 may differently encrypt data associated with different classification levels (e.g., use different cryptographic processes). After the data has been encrypted, the encrypted data may be transmitted to a third interface. The third interface may refer to storage interface 208 (FIGS. 2, 3). The encrypting step may be bypassed for the least one attribute (810). In some embodiments, both the user data and at least one attribute may be transmitted to crypto interface 108. Crypto interface 108 may determine which data to encrypt and which data to allow to pass through unencrypted. Thus process 800 may include filtering the at least one attribute to confirm the at least one attribute is data of a type that does not require encryption. In some embodiments, the crypto interface 108 may filter the one or more attributes to confirm that they are associated with a valid command (one of a plurality of other pre-determined actions, such as read, write, etc.) and/or a valid storage medium location (e.g., a range of sector addresses associated with the classification level of the data to be stored). This may advantageously ensure that extraneous data does not pass through storage architecture 102 unencrypted. The unencrypted attribute may be transmitted to the third interface (storage interface 208).

Process 800 includes associating, at the third interface (storage interface 208), the encrypted data with the at least one attribute (812). The one or more attributes are associated with the encrypted data after the attributes bypassed the encryption in step 810. Associating the encrypted data with the one or more attributes includes determining a classification level based on the at least one non-data attribute. The one or more attributes may be used to determine a location on a storage medium for storing the encrypted data. The attributes may indicate, e.g., a classification level associated with the data. The encryption process of step 808 and the storage location may be based on the classification. That is, data associated with different classification levels may undergo different encryption processes and be stored at different locations on, e.g., media 210. Associating the data with the at least one attribute includes comparing a classification level to a mapping of classification level and memory storage location. The mapping may be provided by, e.g., a configuration attribute (a component stored in partition 504 of FIG. 5). A memory storage location at which the encrypted data will be stored may be determined based on the comparison. The location may specify a storage device 106, a media 210, and/or a sector address or sector address range on a media 210. In some embodiments, process 800 also includes receiving the data to be stored and the at least one attribute at a fourth interface. The fourth interface may refer to media interface 232. The fourth interface is configured to communicate with the storage medium. The data to be stored and the one or more attributes may be transmitted from the fourth interface to the storage medium. Process 800 includes transmitting the encrypted data to the storage medium (814). The storage medium may include a plurality of locations, where each location associated with a different classification level. For example, a range of sector addresses may be associated with each classification level. The one or more associated attributes (e.g., a master boot record attribute, a configuration attribute, etc.) may be used to identify the appropriate storage location. Data for a particular classification level may be written to only the specified range on media 210.

Figure 9:
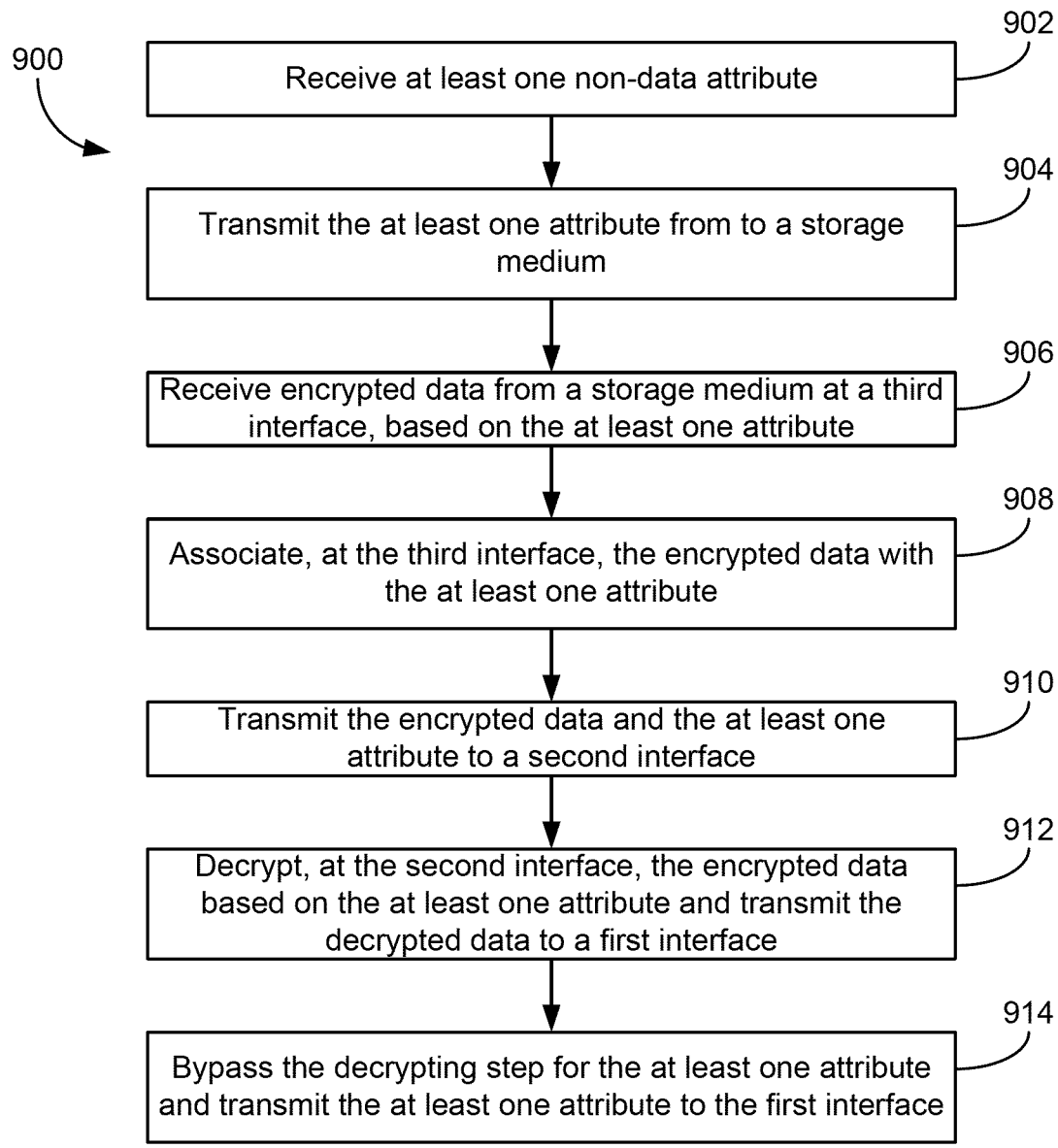
FIG. 9 is a flow diagram of a process for accessing or retrieving stored data, according to an exemplary embodiment.

Referring to FIG. 9, a flow diagram of a process 900 for accessing or retrieving stored data is shown, according to an exemplary embodiment. Process 900 may be implemented by storage system 100 and storage architecture 102 (FIGS. 1, 2, 3). Process 900 includes receiving at least one attribute at a first interface (902). First interface may refer to the file interface 204 of storage architecture 102 (FIGS. 2, 3). The at least one attribute may include a read command for data to be accessed. The at least one attribute may be received from a connected system (e.g., system I/O 104), or may be generated by storage architecture 102 in response to a command received from the connected system. "Connected" may refer to wired or wireless communication and/or coupling between a computing device used to access data and the storage architecture 102. In other embodiments, the at least one attribute may include a variety of others attributes, including a storage command attribute, a storage medium location attribute, a storage medium master boot record attribute, a configuration attribute, and a data classification attribute, as described in the discussion of FIG. 8.

Process 900 includes transmitting the at least one attribute to a storage medium (904). The one or more attributes may include a read command for encrypted data, a location of the encrypted data to be retrieved, a classification level of the data, a folder name, a file name, etc. The one or more associated attributes (e.g., a master boot record attribute, a configuration attribute, etc.) may be used to identify the storage location of the encrypted data and the encrypted data to be accessed. Data for a particular classification level may be read from only the specified range. Based on the at least one attribute, encrypted data may be received from the storage medium at a third interface (906). Third interface may refer to storage interface 208. The storage medium may include a plurality of locations, where each location is associated with a different classification level. For example, a range of sector addresses may be associated with each classification level. In some embodiments, process 900 includes receiving the encrypted data and the at least one attribute at a fourth interface. The fourth interface may refer to media interface 232. The fourth interface is configured to communicate with the storage medium. The encrypted data and the attribute may be transmitted from storage medium to the fourth interface. Process 900 may also include transmitting the encrypted data and the at least one attribute from the fourth interface to the third interface.

Process 900 includes associating, at the third interface or media interface 232, the encrypted data with the at least one attribute (908). Associating the encrypted data with the one or more attributes includes determining a classification level based on the at least one attribute. The one or more attributes may be used to determine a location on a storage medium from which the encrypted data is retrieved and to determine which cryptographic process is used for decryption. The decryption process of step 912 and the storage location may be based on the classification. Associating the data with the at least one attribute includes comparing a classification level to a mapping of classification level and cryptographic processes. The classification level may specify a particular process to be used (e.g., different encryption/decryption processes may be used for, "sensitive," "secret," "top secret," and other varying degrees of classification).

Process 900 includes transmitting the encrypted data and the at least one attribute to a second interface (910). The second interface may refer to crypto interface 108. The encrypted data may be decrypted at the second interface (912). Decrypting the data may include determining the classification level of the encrypted data based on the at least one attribute. The classification level may be associated with one of a plurality of cryptographic processes. Each of the plurality of cryptographic process may be used to differently encrypt/decrypt data associated with a different classification level. That is, the second interface may differently decrypts data associated with different classification levels. The encrypted data may be decrypted using the selected cryptographic process. The cryptographic process used may be based on the classification (as indicated, e.g., by the one or more attributes) and may be determined in step 908. The decrypted data may be transmitted to a first interface 204. First interface may refer to the file interface 204 of storage architecture 102 (FIGS. 2, 3). Crypto interface 108 may determine which data to decrypt and which data does not require decryption. Thus process 990 may include filtering the at least one attribute to confirm the at least one attribute is data of a type that does not require decryption. In some embodiments, the crypto interface 108 may filter the one or more attributes to confirm that they are associated with a valid command (one of a plurality of other pre-determined actions, such as read, write, etc.) and/or a valid storage medium location (e.g., a range of sector addresses associated with the classification level of the data to be stored). This may advantageously ensures that extraneous data does not pass through storage architecture 102. Process 900 includes bypassing the decrypting step for the at least one attribute and transmitting the at least one attribute to the first interface (914). In some embodiments, process 900 includes receiving the decrypted data at a zeroth interface. The zeroth interface may refer to I/O interface 230. The zeroth interface is configured to communicate with a computing system (e.g., system I/O 104 of FIG. 1) coupled to at least one of the zeroth, first, second, and third interfaces. The decrypted data may be transmitted from the zeroth interface to the coupled computing system.

While the description herein has referred to classified data and secured storage, the systems, methods, and apparatuses described herein may be used for other purposes. The systems, methods, and apparatuses may also be used for non-data-at-rest applications.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising tangible machine-readable storage media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, a special purpose computer, or special purpose processing machines to perform a certain function or group of functions.

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of storing data, comprising:
receiving, at a first interface, data to be stored and at least one attribute, the at least one attribute comprising a write command;
associating the data to be stored with the at least one attribute, wherein the at least one attribute specifies a classification level of the data to be stored;
transmitting the data to be stored and the at least one attribute to a second interface;
encrypting, at the second interface, the data to be stored based on the at least one attribute and transmitting the encrypted data to a third interface, wherein the second interface differently encrypts data associated with different classification levels;
bypassing the encrypting step for the at least one attribute and transmitting the at least one attribute to the third interface;
associating, at the third interface, the encrypted data with the at least one attribute and determining a location on a storage medium for storing the encrypted data based on the at least one attribute and based on a mapping between a plurality of partitions of the storage medium and the second interface, the mapping provided by a partition table contained in a master boot record of the storage medium;
transmitting the encrypted data to the storage medium, wherein the storage medium includes a plurality of locations, each location associated with a different classification level;
confirming the at least one attribute is associated with a valid command and a valid storage medium location by filtering, wherein the filtering determines, based on the at least one attribute, that the valid command comprises one of a plurality of pre-determined actions and that the valid storage medium location comprises a range of sector addresses within a partition allocation associated with the classification level of the data to be stored, and wherein the filtering prevents any extraneous data from being transmitted to the storage medium unencrypted, wherein the extraneous data includes data that is not at least one of encrypted data, a valid command, and an attribute; and
encrypting a critical boot sector and allowing a security domain to determine a structure of an associated partition of the critical boot sector with a security key associated with the security domain but not allowing raw access to the critical boot sector.

2. The method of claim 1, further comprising:
receiving the data to be stored at a zeroth interface, wherein the zeroth interface is configured to communicate with a computing system coupled to at least one of the zeroth, first, second, and third interfaces; and
transmitting the data to be stored from the zeroth interface to the first interface.

3. The method of claim 1, further comprising:
receiving the data to be stored and the at least one attribute at a fourth interface, wherein the fourth interface is configured to communicate with the storage medium; and
transmitting the data to be stored and the attribute from the fourth interface to the storage medium.

4. The method of the claim 1, wherein the at least one attribute comprises at least one of: a storage command attribute, a storage medium location attribute, a storage medium master boot record attribute, a configuration attribute, and a data classification attribute.

5. The method of claim 1, wherein encrypting the data to be stored comprises:
determining the classification level of the data based on the at least one attribute;
associating the classification level with one of a plurality of cryptographic processes, each of the plurality of cryptographic processes associated with a different classification level;
encrypting the data to be stored using a selected cryptographic process.

6. The method of claim 1, further comprising:
filtering the at least one attribute to confirm the at least one attribute is data of a type that does not require encryption.

7. The method of claim 1, wherein associating the encrypted data with the at least one attribute comprises:
determining a classification level based on the at least one attribute;
comparing the classification level based on the at least one attribute to a mapping of classification level and memory storage location; and
determining a memory storage location at which the encrypted data will be stored based on the comparison.

8. A method of accessing stored data, the method comprising:
receiving at least one attribute at a first interface, the at least one attribute comprising a read command for data to be accessed;
transmitting the at least one attribute to a storage medium;
receiving encrypted data from the storage medium at a third interface, based on the at least one attribute, wherein the storage medium includes a plurality of partitions having a plurality of locations, each partition associated with a different classification level of encrypted data, wherein receiving the encrypted data includes determining a location for the encrypted data on the storage medium based on a mapping between the plurality of partitions and a second interface, the mapping provided by a partition table contained in a master boot record of the storage medium;
associating, at the third interface, the encrypted data with the at least one attribute and determining a classification level of the encrypted data;
transmitting the encrypted data and the at least one attribute to a second interface;
decrypting, at the second interface, the encrypted data based on the at least one attribute and transmitting the decrypted data to a first interface, wherein the second interface differently decrypts data associated with different classification levels;

bypassing the decrypting step for the at least one attribute and transmitting the at least one attribute to the first interface;

confirming the at least one attribute is associated with at least one of a valid command and a valid storage medium location by filtering, wherein the filtering determines that the valid command comprises one of a plurality of pre-determined actions and the valid storage medium location comprises a range of sector addresses within a partition allocation of the storage medium associated with the classification level of the stored data, and wherein the filtering prevents any extraneous data from being transmitted to the storage medium unencrypted, wherein the extraneous data includes data that is not at least one of encrypted data, a valid command, and an attribute; and encrypting a critical boot sector and allowing a security domain to determine a structure of an associated partition of the critical boot sector with a security key associated with the security domain but not allowing raw access to the critical boot sector.

9. The method of claim 8, further comprising:

receiving the decrypted data at a zeroth interface, wherein the zeroth interface is configured to communicate with a computing system coupled to at least one of the zeroth, first, second, and third interfaces; and transmitting the decrypted data from the zeroth interface to the coupled computing system.

10. The method of claim 8, further comprising:

receiving the encrypted data and the at least one attribute at a fourth interface, wherein the fourth interface is configured to communicate with the storage medium; and transmitting the encrypted data and the at least one attribute from the fourth interface to the third interface.

11. The method of the claim 8, wherein the at least one attribute comprises at least one of: a storage command attribute, a storage medium location attribute, a storage medium master boot record attribute, a configuration attribute, and a data classification attribute.

12. The method of claim 8, wherein decrypting the encrypted data comprises:

determining the classification level of the encrypted data based on the at least one attribute;

associating the classification level with one of a plurality of cryptographic processes, each of the plurality of cryptographic processes associated with a different classification level;

decrypting the encrypted data using a selected cryptographic process.

13. The method of claim 8, further comprising:

filtering the at least one attribute to confirm the at least one attribute is data of a type that does not require decryption.

14. The method of claim 8, wherein associating the encrypted data with the at least one attribute comprises:

determining a classification level based on the at least one attribute;

comparing the classification level based on the at least one attribute to a mapping of classification level and cryptographic processes;

determining a cryptographic process to decrypt the encrypted data based on the comparison.

15. The method of claim 8, further comprising:

filtering the encrypted data to confirm the encrypted data is associated with the valid storage medium location.

16. A data storage system, comprising:

an electronic storage architecture configured to be coupled to a computing system and a storage medium, the electronic storage architecture mediating the storing and accessing of data at the storage medium in response to commands to write or read data received from the computing system, the electronic storage architecture comprising:

a file interface configured to process at least one attribute associated with a data, the least one attribute comprising at least one of a storage command attribute, a storage medium location attribute, a storage medium master boot record attribute, a configuration attribute, and a data classification attribute;

a crypto interface configured to encrypt and decrypt the data based on the at least one attribute, wherein the at least one attribute specifies a classification level of the data, wherein the crypto interface comprises a plurality of cryptographic functions, each cryptographic function associated with a different classification level, and wherein the crypto interface comprises a bypass channel configured to transmit the at least one attribute without encryption or decryption;

a storage interface configured to provide a mapping between a plurality of partitions on the storage medium and the plurality of cryptographic functions, the mapping provided by a partition table contained in a master boot record of the storage medium, the storage interface configured to provide at least a portion of the partition table to the file interface, wherein each of the plurality of partitions is associated with a different classification level, wherein the crypto interface confirms the at least one attribute is associated with a valid storage medium location by a filtering process that prevents any extraneous data from being stored in the storage medium unencrypted, wherein the extraneous data includes data that is not at least one of encrypted data, a valid command, and an attribute, wherein the valid storage medium location comprises a range of sector addresses associated with the classification level of the data to be written or read in response to the commands; and a critical boot sector configured to be encrypted and to allow a security domain to determine a structure of an associated partition of the critical boot sector with a security key associated with the security domain but not to allow raw access to the critical boot sector.

17. The data storage system of claim 16, wherein the electronic storage architecture further comprises:

an input/output (I/O) interface configured to communicate with the coupled computing system.

18. The data storage system of claim 16, wherein the electronic storage architecture further comprises:

a media interface configured to communicate with the storage medium.

* * * * *